April 26, 1927.
R. LJUNGKULL
1,625,859
EXCAVATOR CRANE
Filed April 15, 1926
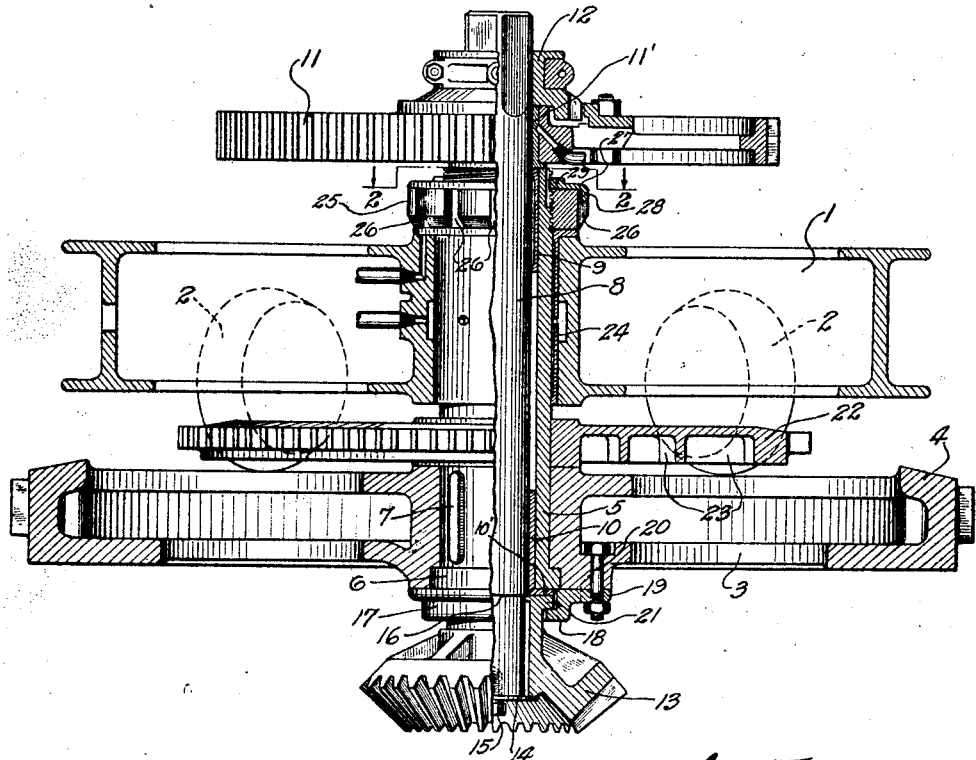
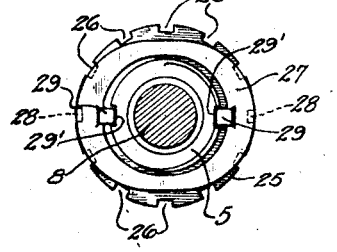
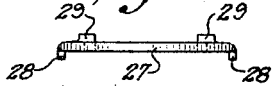
INVENTOR.
ROLF LJUNGKULL.
BY
ATTORNEYS Patented Apr. 26, 1927.

1,625,859

UNITED STATES PATENT OFFICE.

ROLF LJUNGKULL, OF MILWAUKEE, WISCONSIN, ASSIGNOR TO HARNISCHFEGER CORPORATION, OF MILWAUKEE, WISCONSIN, A CORPORATION.

EXCAVATOR CRANE.

Application filed April 15, 1926. Serial No. 102,154.

This invention relates to improvements in excavator cranes, and more particularly to the means for adjusting the gudgeon pin thereof and locking the same in adjusted position.

One of the objects of the present invention is to provide means of the character referred to which is locked or held in adjusted position without the use of the setting bolts or screws such as have been used heretofore for this purpose, and which may be readily adjusted to take up on the gudgeon pin without the use of any special tools or the necessity of removing any such parts as the setting bolts or screws referred to.

Another object is to provide improved means of the character referred to which has advantages over such means used heretofore as regards accessibility, ease of adjustment, and simplicity of construction.

In the drawings:

Figure 1 is a sectional view taken through the center of an excavator crane of the full-revolving type;

Fig. 2 is a section on line 2—2 of Fig. 1;

Fig. 3 is a top plan view of one of the parts; and

Fig. 4 is a front elevational view of Fig. 3.

In Fig. 1 are shown the revolvable frame 1 supported upon the usual rollers 2 for rotation with respect to the gear 3 fixed in the usual manner to the tractor frame (not shown), the gear being provided with a track 4 for the rollers. The gudgeon pin 5 is a hollow, cylindrical member passing through the center of gear 3 and the axis of rotation of frame 1, the pin being provided at the lower end thereof with a head 6 countersunk in the underside of gear 3, as shown. The pin 5 is fixed against rotation with respect to gear 3 by a key 7 or other suitable means. The usual drive shaft 8 extends loosely through suitable bushings 9 and 10 fitted in the upper and lower ends of pin 5, the driving gear 11 which is connected to the prime mover for operating the machine being arranged on the upper end of shaft 8 and locked against rotary movement with respect thereto by any suitable means indicated generally by reference numeral 12. A suitable bushing 11' may be fitted on the upper end of shaft 8 between the same and gear 11, as shown. The drive shaft 8 is connected to the usual transmission mechanism for the tractor through a beveled gear 13 arranged upon and keyed to the lower end of the shaft. The beveled gear is held by a ring or member 17 provided with an inwardly extending flange 18 and lugs 19 which receive bolts 20 by which the ring is fixed to the underside of gear 3, flange 18 providing a seat for the head or flange 21 at the upper end of the hub of gear 13. As shown in Fig. 1, the lower end of pin 5 seats upon flange 21, bushing 10 being provided at its lower end with an outwardly extending flange 10' interposed between these parts to provide a thrust bearing at this point. For the purpose of supporting shaft 8 against downward axial movement, the same may be provided with a shoulder 16 arranged to seat upon the inner edge of flange 21, as shown. From the foregoing it will be seen that the ring or member 17 supports pin 5, gear 13 and shaft 8, as well as gear 11 which seats upon the upper end of pin 5.

For the purpose of holding in place the key (not shown) by which gear 13 is fixed to the lower end of shaft 8, a plate 14 may be fixed to the lower end of the latter with its edge extending slightly beyond the same to provide a seat upon which the lower end of this key may rest.

A gear 22 is arranged loosely on pin 5 between frame 1 and gear 3 and rests upon the latter, gear 22 being provided on its underside with cam grooves 23 and forming part of a steering gear of the general type described and claimed in copending application bearing Serial Number 4,800, filed January 26, 1925.

A bushing 24 is fitted upon pin 5 between the same and frame 1 to permit free rotation of the latter with respect to the pin.

A lock nut 25 is threaded upon the upper end of pin 5 and provided with vertical grooves 26 formed in its outer edge. A locking member 27 is loosely fitted upon the upper threaded end of pin 5 and is provided with downwardly extending and diametrically arranged lugs 28 adapted to fit into a pair of grooves 26, as more clearly shown in Fig. 2, the member being further provided at its inner edge with inwardly extending lugs 29 arranged to fit into diametrically arranged grooves 29' formed in the threaded end of pin 5 and extending longitudinally thereof.

As shown in Fig. 1, the upper end of bushing 24 may extend outwardly between frame 1 and nut 25 to provide a thrust bearing between these parts.

When locking member 27 is in locking position, the threaded end of pin 5 extends slightly above the latter an amount at least equal to the length of the downwardly extending lugs 28, the arrangement being such that upon upward axial movement of member 27, lugs 28 will be disengaged from grooves 26 to permit adjustment of nut 25, while lugs 29 will still maintain their position in slots 29'. The advantage of this construction is that in placing member 27 back in locked position, it is merely necessary to adjust nut 25 so that a pair of diametrically arranged grooves 26 are coincident with lugs 28, since lugs 29 will always be interlocked with grooves 29' in the upper threaded end of pin 5.

As is well known, the gudgeon pin provides a pivot about which the frame 1 and machinery mounted thereon may revolve, and holds the frame centrally with respect to gear 3 and the tractor frame to which the latter is fixed. The gudgeon pin also provides a bearing for drive shaft 8 and holds the upper part of the machine including frame 1 and the mechanism mounted thereon from overturning should the center of gravity of these parts fall beyond what is termed the "swing circle".

In the construction used heretofore, the upper end of the gudgeon pin has been provided with a head similar to head 6, and the lower end of the pin threaded to receive a suitable lock nut, a keeper plate being employed to hold the nut in adjusted position. This keeper plate has been secured to the underside of gear 3 by means of bolts or screws and has been arranged to engage the outer edge of the lock nut to hold the same in its position of adjustment. In this construction, it has been necessary in readjusting the parts in order to take up on the gudgeon pin, to get under the machine and remove the keeper plate by first removing the bolts or screws holding the same in position, and to then turn the nuts to the desired position of adjustment and to replace the keeper plate and the holding bolts or screws therefor.

In the herein described improved construction, it will be seen that the parts are much more accessible than in the construction used heretofore and that there are no bolts or screws to be removed in readjusting the gudgeon nut. In making a readjustment, the member 27 is merely lifted from nut 25 until lugs 28 are withdrawn from grooves 26, the member being held in this position in any manner such as by placing a stick or suitable tool between the latter and nut. Nut 26 may then be rotated to take up on the gudgeon pin 5, after which the stick or other means is removed and member 27 permitted to drop into locking position, as shown in Fig. 1, lugs 29 locking member 27 against rotary movement with respect to pin 5 while lugs 28 lock nut 25 against rotary movement with respect to the member, whereby the nut is locked in adjusted position against rotary movement with respect to the pin.

A preferred embodiment of the invention has been shown and described, but of course various changes in the size, shape and arrangement of the parts may be adopted without departing from the spirit of the invention or the scope of the claims.

The invention claimed is:

1. In an excavator crane of the character referred to, the combination with a relatively fixed gear, a frame arranged above said gear and supported for rotary movement with respect thereto, of a hollow cylindrical pin provided at its lower end with a head and extending upwardly through the center of said gear and the axis of rotation of said frame, said pin being threaded at its upper end and provided therein with a longitudinally extending groove, a nut threaded upon said end and acting upon the upper side of said frame to hold the latter against axial movement with respect to said gear, said nut being provided at its outer edge with a plurality of longitudinally extending grooves, and a locking member arranged loosely upon the threaded end of said pin above said nut and resting upon the latter, said member being provided at its inner edge with an inwardly extending lug engaging the groove in said threaded end and at its outer edge with a downwardly extending lug arranged in one of said grooves with which the nut is provided, the arrangement being such that upon upward axial movement of said washer upon said pin said downwardly extending lug is disengaged from said nut to permit adjustment of the latter while said inwardly extending lug maintains its locking engagement with the threaded end of said pin.

2. In an excavator crane of the character described, the combination with a lower frame and an upper frame supported thereby for rotation with respect thereto, a pin extending through said frames and holding said upper frame in operative relation with respect to the lower frame for rotation about an axis relatively fixed with respect thereto, said pin being provided at one end thereof with a head engaging the outer side of one of said frames, the other end of said pin being threaded and extending beyond the other frame, and an adjusting nut threaded upon said latter end and engaging said other frame for holding said pin and frames in assembled relation while permitting free rotary movement of said upper frame, of a locking member arranged loosely on said threaded end and interlocking with the latter and said nut whereby the latter is locked in adjusted position on said pin, said member being movable out of interlocking relation with said nut upon axial movement away from the latter.

3. In an excavator crane of the character described, upper and lower frames, a hollow cylindrical pin extending upwardly through said frames and provided at its lower end with a head engaging the underside of the lower frame, the upper end of said pin being threaded and extending above the upper frame, said upper frame being freely rotatable about said pin, a drive shaft extending loosely through said pin and provided at its upper end with a driving gear fixed thereto in a plane spaced vertically above the threaded end of said pin, an adjusting nut threaded upon said latter end and engaging the upper frame to hold said frames in operative relation, and a locking member arranged loosely upon said threaded end of said pin for axial movement along the same in the space provided between said latter end and said driving gear, said member being adapted to seat upon said nut and to interlock when so seated with said threaded end and said nut, said member being movable out of interlocking relation with said nut upon upward axial movement away from the latter.

In witness whereof I hereto affix my signature.

ROLF LJUNGKULL.